United States Patent
Bains et al.

(10) Patent No.: US 9,158,616 B2
(45) Date of Patent: Oct. 13, 2015

(54) METHOD AND SYSTEM FOR ERROR MANAGEMENT IN A MEMORY DEVICE

(75) Inventors: Kuljit S. Bains, Olympia, WA (US); David J. Zimmerman, El Dorado Hills, CA (US); Dennis W. Brzezinski, Sunnyvale, CA (US); Michael Williams, Folsom, CA (US); John B. Halbert, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 13/619,452

(22) Filed: Sep. 14, 2012

(65) Prior Publication Data

US 2013/0117641 A1 May 9, 2013

Related U.S. Application Data (63) Continuation-in-part of application No. 12/634,286, filed on Dec. 9, 2009, now Pat. No. 8,862,973.

(51) Int. Cl.
*G06F 11/00* (2006.01)
*G06F 11/10* (2006.01)

(52) U.S. Cl.
CPC ............ *G06F 11/10* (2013.01); *G06F 11/1016* (2013.01)

(58) Field of Classification Search
CPC ..... G06F 11/1004; H03M 13/09; G11C 29/42
See application file for complete search history.

(56) References Cited

U.S. PATENT DOCUMENTS

| | | | |
|---|---|---|---|
| 7,161,857 B2 | 1/2007 | Parekh | |
| 7,477,522 B2* | 1/2009 | Hazelzet | 361/760 |
| 7,493,531 B2 | 2/2009 | Ito et al. | |
| 2003/0163769 A1 | 8/2003 | Phelps | |
| 2004/0030737 A1 | 2/2004 | Hassner et al. | |
| 2006/0069948 A1 | 3/2006 | Seo et al. | |
| 2007/0033512 A1 | 2/2007 | Johnson | |
| 2007/0226579 A1* | 9/2007 | Alexander et al. | 714/758 |
| 2008/0002590 A1* | 1/2008 | Thomas et al. | 370/242 |
| 2008/0155378 A1 | 6/2008 | Amidi | |

(Continued)

FOREIGN PATENT DOCUMENTS

| | | |
|---|---|---|
| CN | 101206703 A | 6/2008 |
| CN | 101303716 A | 11/2008 |

(Continued)

OTHER PUBLICATIONS

Office Action Received for Chinese Patent Application No. 201010592177.7, mailed on Aug. 8, 2013, 9 pages of Chinese Office Action and 16 pages of English Translation.

(Continued)

*Primary Examiner* — Christopher McCarthy
(74) *Attorney, Agent, or Firm* — Vincent Anderson Law, PC (57) ABSTRACT

A method and system for error management in a memory device. In one embodiment of the invention, the memory device can handle commands and address parity errors and cyclic redundancy check errors. In one embodiment of the invention, the memory can detect whether a received command has any parity errors by determining whether the command bits or the address bits of the received command has any parity errors. If a parity error or cyclic redundancy check error in the received command is detected, an error handling mechanism is triggered to recover from the errant command.

16 Claims, 6 Drawing Sheets

(56) References Cited

U.S. PATENT DOCUMENTS

| | | |
|---|---|---|
| 2008/0195922 A1 | 8/2008 | Lee |
| 2009/0158122 A1 | 6/2009 | Gagnon |
| 2011/0055671 A1 | 3/2011 | Kim et al. |
| 2011/0138261 A1 | 6/2011 | Bains et al. |
| 2013/0304981 A1* | 11/2013 | Paz ............................. 711/105 |
| 2013/0314429 A1* | 11/2013 | Croxford et al. ............. 345/531 |

FOREIGN PATENT DOCUMENTS

| | | |
|---|---|---|
| WO | 2004/107175 A1 | 12/2004 |
| WO | 2009/017991 A1 | 2/2009 |

OTHER PUBLICATIONS

Combined Search and Examination Report for United Kingdom Patent Application No. 1308311.8, Mailed on Sep. 27, 2013, 5 pages.
Examination Report received for United Kingdom Patent Application No. GB1018116.2, mailed on Jun. 25, 2013, 5 pages.
Office Action received for United Kingdom Patent Application No. 1308311.8, mailed on Jun. 25, 2013, 2 pages.
DDR3 SDRAM Standard, JEDEC Standard, Sep. 2009, 220 pages, JEDEC Solid State Teclmology Association 2009, Arlington, VA.
Office Action received for Chinese Patent Application No. 201010592177.7, mailed on Jul. 31, 2012, 16 pages.
Response to Office Action received for United Kingdom Patent Application No. 1018116.2, filed on Feb. 9, 2012, 18 pages.
Response to Office Action received for United Kingdom Patent Application No. 1203788.3, filed on Nov. 27, 2012, 10 pages.
Response to Office Action received for United Kingdom Paten Application No. 1018116.2, filed on Jul. 23, 2012, 3 pages.
Search Report and Office Action for Great Britain Patent Application No. 1203788.3, mailed on May 31, 2012, 5 pages.
Office Action Received for Chinese Patent Application No. 201010592177.7, mailed on Jan. 21, 2013, 8 pages of Chinese Office Action and 15 pages of English Translation.
Office Action Received for United Kingdom Patent Application No. GB1018116.2, mailed on Feb. 19, 2013, 1 page of Office Action only.
Response to Office Action 1 for CN Application No. 201010592177.7, dated Dec. 12, 2012, 14 pp. (w/ English Translation of Claims).
Response to Office Action 2 for CN Application No. 201010592177.7, dated Apr. 3, 2013, 14 pp. (w/ English Translation of Claims).
Response to Office Action 3 for CN Application No. 201010592177.7, dated Oct. 23, 2013, 14 pp. (w/ English Translation of Claims).
Final Office Action 1 for CN Application No. 201010592177.7, dated Mar. 4, 2014, 23 pp. (w/ English Translation).
Response to Office Action 3 for GB Application No. 1018116.2, dated May 13, 2013, 17 pp.
Response to Office Action 4 for GB Application No. 1018116.2, dated Oct. 25, 2013, 18 pp.
Office Action 5 for GB Application No. 1018116.2, dated Dec. 19, 2013, 2 pp.
Response to Office Action 5 for GB Application No. 1018116.2, dated Apr. 4, 2014, 4 pp.
Notice of Allowance for GB Application No. 1203788.3, dated Mar. 26, 2013, 2 pp.
Response to Office Action 1 for GB Application No. 1308311.8, dated Jul. 24, 2013, 8 pp.
Response to Office Action 2 for GB Application No. 1308311.8, dated Feb. 18, 2014, 7 pp.
Office Action 3 for GB Application No. 1308311.8, dated Mar. 4, 2014, 3 pp.
Response to Office Action 3 for GB Application No. 1308311.8, dated Mar. 31, 2014, 6 pp.
Office Action 1 for GB Application No. 1402999.5, dated Mar. 3, 2014, 2 pp.
Response to Office Action 1 for GB Application No. 1402999.5, dated Apr. 8, 2014, 6 pp.
Office Action 2 for GB Application No. 1402999.5, dated May 6, 2014, 2 pp.
Office Action 1 for TW Application No. 099135757, dated Mar. 25, 2014, 14 pp. (w/ English Translation).
Office Action 1 for U.S. Appl. No. 12/634,286, dated Apr. 16, 2012, 12 pp.
Response to Office Action 1 for U.S. Appl. No. 12/634,286, dated Jul. 16, 2012, 9 pp.
Final Office Action 1 for U.S. Appl. No. 12/634,286, dated Sep. 14, 2012, 13 pp.
Response to Final Office Action 1 for U.S. Appl. No. 12/634,286, dated Nov. 14, 2012, 11 pp.
Office Action 3 for U.S. Appl. No. 12/634,286, dated Jun. 17, 2013, 14 pp.
Response to Office Action 3 for U.S. Appl. No. 12/634,286, dated Oct. 16, 2013, 13 pp.
Notice of Allowance 1 for U.S. Appl. No. 12/634,286, dated Dec. 9, 2013, 9 pp.
Notice of Allowance 2 for U.S. Appl. No. 12/634,286, dated Feb. 20, 2014, 9 pp.

* cited by examiner

FIG. 1

| 210<br>C/A parity (Wr) | 215<br>CRC error (Wr) | 220<br>Error status<br>(Rd / Wr) | 225<br>CRC error status<br>(Rd / Wr) | 230<br>Error log (Rd) |
|---|---|---|---|---|
| 0 = Disable<br>1 = Enable | 0 = Disable<br>1 = Enable | 0 = No error<br>1 = Error | 0 = No error<br>1 = Error | Errant C/A frame |

| C/A Parity Latency MR5[2:0]* | C/A Parity Error Status MR5[4] | Errant C/A Frame |
|---|---|---|
| 000 = Disabled | 0=clear | |
| 001= 4 Clocks | | |
| 010= 5 Clocks | 1=Error | C2-C0, ACT_n, BG1, BG0, BA0, BA1, PAR, A17, A16/RAS_n, A15/CAS_n, A14/WE_n, A13:A0 |
| 011= 6 Clocks | | |
| 100= 8 Clocks | | |

FIG. 9

METHOD AND SYSTEM FOR ERROR MANAGEMENT IN A MEMORY DEVICE

This application is a continuation-in-part of U.S. patent application Ser. No. 12/634,286, filed Dec. 9, 2009, and claims priority to and is incorporated herewith.

FIELD OF THE INVENTION

This invention relates to a memory device, and more specifically but not exclusively, to the error management of errors such as command and/or address parity errors and cyclic redundancy check errors in the memory device.

BACKGROUND DESCRIPTION

In a typical computer system, a memory controller facilitates the access of one or more memories in the computer system. In a scenario where the communication between memory controller and the memories is corrupted, the memories may receive an errant command. This results in the corruption of the data in the memories as the memories do not have any mechanism to detect errant commands and will perform all write operations. In order to recover from the errant command, the computer system needs to reboot. This affects the performance of the computer system and critical data may be lost.

BRIEF DESCRIPTION OF THE DRAWINGS

The features and advantages of embodiments of the invention will become apparent from the following detailed description of the subject matter in which.

DETAILED DESCRIPTION

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system for error management in a memory device. In one embodiment of the invention, the memory device can handle commands and address parity errors and cyclic redundancy check errors. In one embodiment of the invention, the memory can detect whether a received command has any parity errors by determining whether the command bits or the address bits of the received command has any parity errors. If a parity error in the received command is detected, an error handling mechanism is triggered to recover from the errant command.

With command/address (C/A) parity support in the memory device, the performance of a system utilizing the memory device can be improved. The system does not need to reboot in order to recover from an errant command received by the memory device. In one embodiment of the invention, the memory device includes but is not limited to, a Synchronous Dynamic Random Access Memory (SDRAM), Dynamic Random Access Memory (DRAM), RAMBUS Dynamic Random Access Memory (RDRAM), double-data-rate three SDRAM (DDR3), DDR four SDRAM (DDR4), and any other type of random access memory device.

Figure 1:
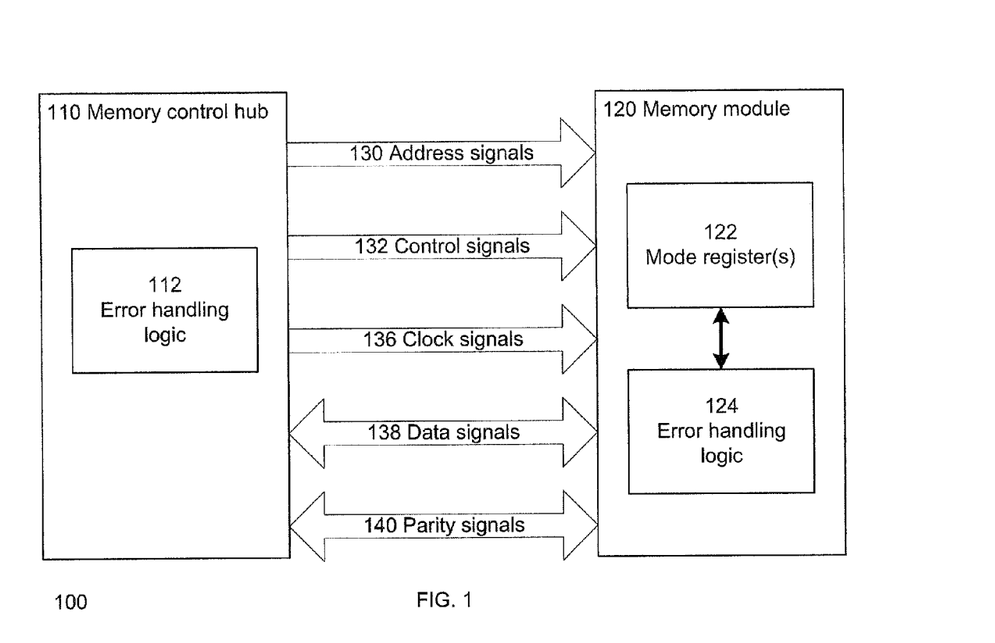
FIG. 1 illustrates a block diagram of a memory control hub and a memory module in accordance with one embodiment of the invention.

FIG. 1 illustrates a block diagram 100 of a memory control hub 110 and a memory module 120 in accordance with one embodiment of the invention. In one embodiment of the invention, the memory module 120 includes, but is not limited to, DRAMs, register devices, buffer devices. The memory control hub 110 has an error handling logic 112 to handle commands and address parity errors when the memory module 120 receives an errant command. The memory control hub 110 communicates with the memory module 120 using signals including, but not limited to, address signals 130, control signals 132, clock signals 136, data signals 138, parity signals 140 and any other signals to facilitate communication between the memory control hub 110 and the memory module 120.

In one embodiment of the invention, when the memory control hub 110 is required to send a command to the memory module 120, the error handling logic 112 in the memory control hub 110 computes the parity of the address signal bits and the command signal bits of the command. A parity bit signal is selected or determined based on an even or odd parity of a combination of the computed parity and the parity bit signal. In one embodiment of the invention, the error handling logic 112 covers the parity for the signals including but not limited to, row address strobe (RAS) signal, column address strobe (CAS) signal, write enable (WE) signal, address bus signals, and bank select signals of the memory module 120. In one embodiment, the memory control hub 110 generates a write data frame and includes cyclic redundancy check (CRC) logic to provide a CRC checksum to cover the write data frame.

The memory control hub 110 provides the parity bit signal as one of the parity signals 140 when a command is sent to the memory module 120. In one embodiment of the invention, the memory module 120, upon receiving a command and its associated parity signal, is able to detect or determine if the received command has any C/A parity error. In another embodiment of the invention, the memory module 120 is able to detect or determine if the received command has any cyclic redundancy check (CRC) error. The memory module 120 has an error handling logic 124 to perform the C/A parity or CRC error detection.

If the memory module 120 detects a parity error in the received command, it ignores the received command and stores the command bits and address bits of the received command in a mode register 122 in one embodiment of the invention. The memory module 120 asserts an indication signal as one of the parity signals 140 to the memory control hub 110 when the parity error in the received command is detected. Similarly, when a CRC error in the received command is detected, the memory module 120 asserts the indication signal as one of the parity signals 140 to the memory control hub 110.

The memory controller hub 110, upon receiving the indication signal, determines from the indication signal whether a parity or a CRC error is present in the received command. The memory controller hub 110 performs an appropriate recovery mechanism to recover from the parity or CRC error. With the error handling logic 112 in the memory control hub 110, it has hooks to recover from errors in the memory module 120.

In one embodiment, one or more bits (e.g., A2:A0) of one of the mode registers 122 (e.g., Mode Register 5) are defined to enable or disable C/A Parity in the memory module (e.g., DRAM) 120. In one embodiment, the default state of the C/A Parity bits is disabled. If C/A parity is enabled by programming a non-zero value to C/A parity Latency in the mode register, then the memory module 120 ensures that there is no parity error before executing the command. The additional delay for executing the commands versus a parity-disabled mode is programmed in the mode register when C/A Parity is enabled (Parity Latency) and is applied to all commands. When C/A Parity is enabled, only DES is allowed between valid commands to prevent the memory module from malfunctioning.

In one embodiment, C/A Parity signal (PAR) covers ACT_n, RAS_n, CAS_n and the address bus including bank address and bank group bits. In one embodiment, the control signals CKE, ODT and CS_n are not included. For example, for a 4 Gbit x4 monolithic device, parity is computed across BG0, BG1, BA1, BA0, A16/RAS_n, A15/CAS_n, A14/WE_n, A13-A0 and ACT_n). In one embodiment the memory module 120 will treat any unused address pins as 0s (e.g., if a common die has stacked pins but the device is use in a monolithic application, then the address pins used for stacking are internally treated as 0s).

In one embodiment, the convention of parity is even parity. That is, valid parity is defined as an even number of ones across the inputs use for parity computation combined with the parity signal. Thus, the parity bit is chosen so that the total number of 1s in the transmitted signal, including the parity bit is even. If the memory module 120 detects a C/A parity error in any command as qualified by CN_n, the following steps are performed:

A. The erroneous command is ignored. Commands in max NnCK window (tPAR_UNKNOWN) prior to the erroneous command are not guaranteed to be executed. When a READ command is in this NnCK window is not executed, the memory module does not activate the DQS outputs.

B. The error is logged by storing the erroneous command and address bits in an error log.

C. The Parity Error Status bit in the mode register is set. In one embodiment, the Parity Error Status bit must be set before the ALERT_n signal is released by the memory module (i.e., tPAR_ALERT_ON+tPAR_ALERT_PW(min)).

D. The ALERT_n signal is asserted to the host within the tPAR_ALERT_ON time.

E. The in-process commands are completed. These commands were received tPAR_UNKNOWN before the erroneous command. If a parity error occurs on a command issued between the tXS_Fast and the tXS window after self refresh exit when the memory module may delay the de-assertion of ALERT_n signal as a result of any internal ongoing refresh.

F. The DRAM waits for tTAS_min before closing open pages. The DRAM does not execute any commands during the window defined by (tPAR_ALERT_ON+tPAR_ALERT_PW).

G. After tPAR_ALERT_PW_min has been satisfied, the DRAM can deassert ALERT_n.

H. After the DRAM has returned to a known pre-charged state, it may de-assert ALERT_n.

I. After (tPAR_ALERT_ON+tPAR_ALERT_PW), the DRAM is ready to accept commands for normal operation. Parity latency will be in effect; however, parity checking will not resume until the memory controller has cleared the Parity Error Status bit by writing a 0 (the DRAM will execute any erroneous commands until the bit is cleared).

J. Is it possible that the DRAM might have ignored a refresh command during the (tPAR_ALERT_ON+tPAR_ALERT_PW) window or the refresh command is the first erroneous frame so, in one embodiment, the controller issues extra refresh cycles as needed.

Figure 8:
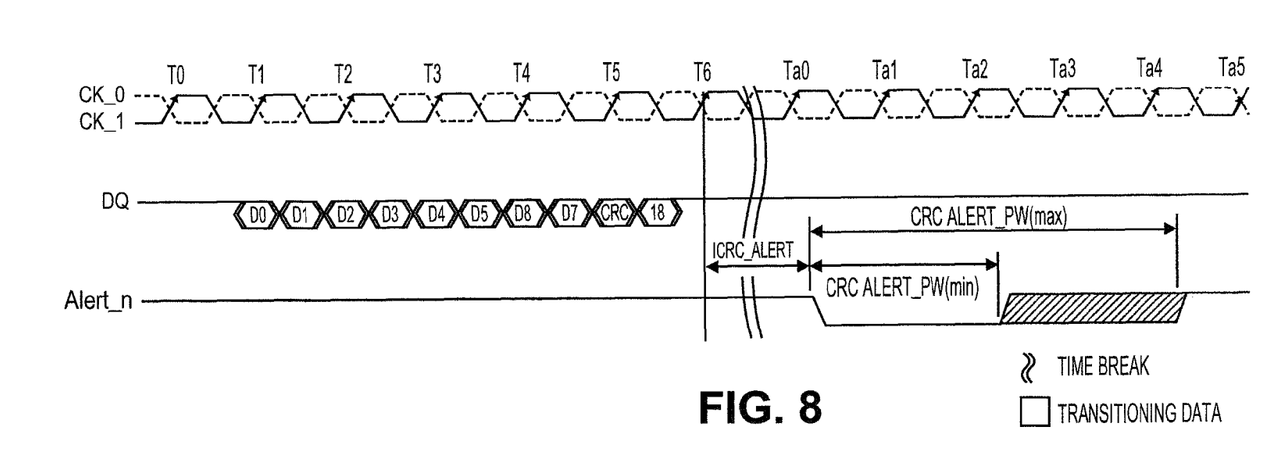
FIG. 8 illustrates a timing diagram for one embodiment of a technique for error management.

K. The Parity Error Status bit may be read any time after (tPAR_ALERT_ON+tPAR_ALERT_PW) to determine which DRAM had the error. The DRAM maintains the error log for the first erroneous command until the Parity Error Status bit is reset to 0. FIG. 8, below, provides additional timing information related to the ALERT_n signal.

One of ordinary skill in the relevant art will readily appreciate that other forms of error detection mechanisms can be implemented without affecting the workings of the invention. In another embodiment of the invention, more than one memory module 120 or memory control hub 110 is present in a system. The memory control hub 110 is integrated into a processor of the system in another embodiment of the invention.

Figure 2:
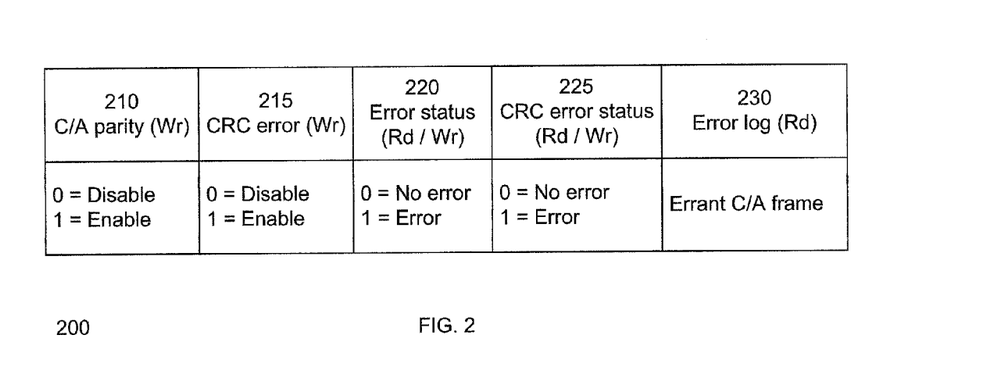
FIG. 2 illustrates a format of a mode register in accordance with one embodiment of the invention.

FIG. 2 illustrates a format 200 of a mode register 122 in accordance with one embodiment of the invention. The mode register 122 has a C/A parity bit 210 and a CRC error bit 215 that can only be written or set by the memory control hub 110. The C/A parity bit 210 allows the activation or deactivation of the parity checks of the memory module 120. The CRC error bit 215 allows the activation or deactivation of a CRC indication pulse when CRC errors are detected in the memory module 120. When the C/A parity bit 210 is asserted or set to logic one, the error handling logic 124 of the memory module 120 is enabled. When the C/A parity bit 210 is de-asserted or set to logic zero, the error handling logic 124 of the memory module 120 is disabled.

The mode register 122 has an error status bit 220 and a CRC error status bit 225 that can be read and written. When a parity error is detected by the memory module 120, the memory module asserts or sets the error status bit 220 to logic one. When a CRC error is detected by the memory module 120, the memory module asserts or sets the CRC error status bit 225 to logic one. When the memory control hub 110 has completed the recovery mechanism or process for the parity or CRC error, it de-asserts or sets the error status bit 220 or CRC error status bit 225 respectively to logic zero.

When the memory module 120 detects a parity error in a received command, the memory module 120 stores the command bits and address bits of the received command in the error log bits 230 of the mode register 122. The memory control hub 110 can read the error log bits 230 to determine which command has been received with parity errors by the memory module 120.

The format 200 of the mode register 122 illustrates one configuration in one embodiment of the invention and is not meant to be limiting. One of ordinary skill in the relevant art will readily appreciate that other variations of the configuration of the mode register 122 can be used without affecting the workings of the invention. In one embodiment of the invention, the mode register 122 is part of a mode register set (MRS) register on a DRAM device.

Figure 3:
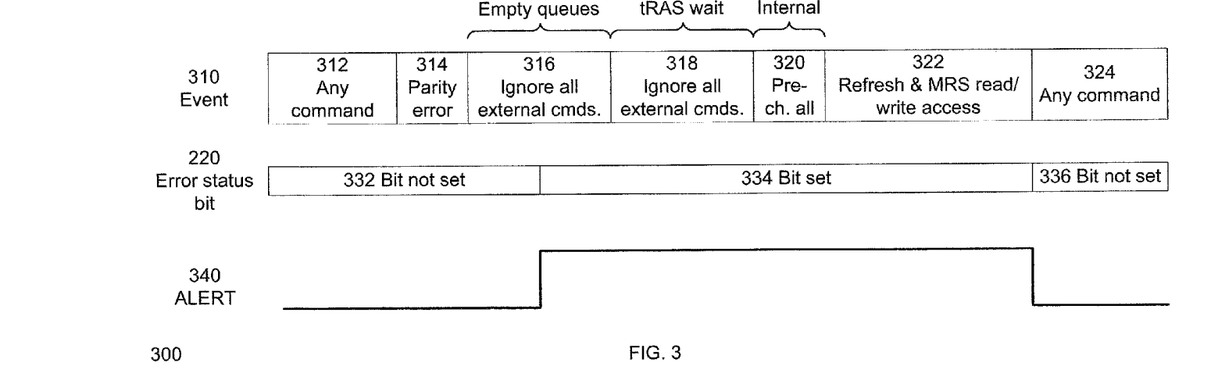
FIG. 3 illustrates a sequence of handling parity errors in a memory module in accordance with one embodiment of the invention.

FIG. 3 illustrates a sequence 300 of handling parity errors in a memory module 120 in accordance with one embodiment of the invention. The events 310 show a possible sequence 300 of events when the memory module 120 receives a command with a parity error. In event 312, the memory module 120 is responding to all commands with a valid or correct parity bit signal. The error status bit 220 and the ALERT signal 340 are not set or asserted during the event 312. This is illustrated in the event bit not set 332. The ALERT signal 340 is an indication signal to the memory control hub 110 that the memory module 120 has received a command with a parity error. In one embodiment of the invention, the ALERT signal is a OR signal that is connected to all memory modules in a system.

In the event 314, the memory module 120 detects or determines that it have received a command with incorrect parity. In the event 316, the memory module 120 ignores the command with incorrect parity and all other external commands. The memory module 120 stores the errant command and address in the error log bits 230 and asserts the error status bit 220. This is illustrated in the event bit set 334. The ALERT signal 340 is asserted when the error status bit 220 is asserted. In the event 316, the memory module 120 empties the queue of pending valid commands that have been received prior to the received errant command, i.e., the memory module 120 waits for all of the pending valid commands to finish execution.

In the event 318, the memory module 120 waits for an active-to-precharge command delay (tRAS) to lapse. The tRAS delay is the number of clock cycles required between a bank active command and issuing the precharge command. In one embodiment of the invention, the memory module 120 waits for the minimum delay time required for tRAS. When the tRAS delay has lapsed, the memory module 120 closes all open pages if there are any.

In the event 320, the memory module 120 issues an internal precharge command to all banks of the memory module 120. In the event 322, the memory module 120 responds to refresh commands and mode register set (MRS) read and write commands from the memory controller hub 110. The memory module 120 does not respond to any other commands in event 322 when the error status bit 220 is asserted. The refresh commands include but are not limited to, refresh-all commands and refresh-group commands.

In event 324, the memory controller hub 110 has completed its error handling recovery process and de-asserts the error status bit 220 using a MRS write command to the mode register 122. The memory module 120 resumes its normal operation and responds to all commands with valid parity. The ALERT signal 340 is de-asserted when the error status bits 220 is de-asserted. This is illustrated in the event bit not set 336.

Figure 4:
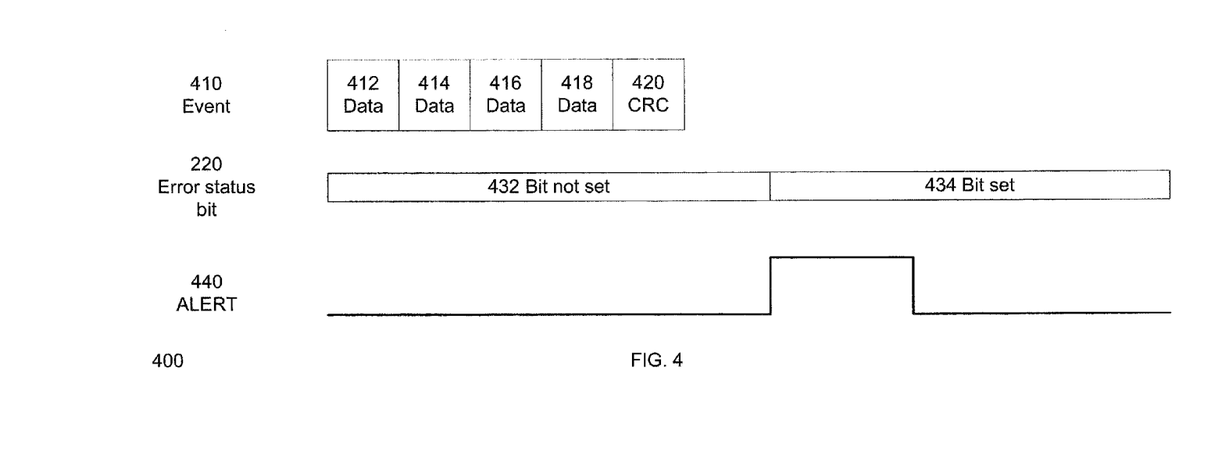
FIG. 4 illustrates a sequence of handling cyclic redundancy check errors in a memory module in accordance with one embodiment of the invention.

FIG. 4 illustrates a sequence 400 of handling CRC errors in a memory module 120 in accordance with one embodiment of the invention. The CRC error mechanism shares the same ALERT signal 340 in one embodiment of the invention. In order to determine between CRC errors and parity errors, the memory control hub 110 needs to read the error status bit 220 of each memory module. This is time consuming and reduces the efficiency of the system.

To overcome this problem, the events 410 show a possible sequence 400 of events when the memory module 120 is writing data with a CRC error. In the events 412 to 418, the memory module 120 has written data in response to a write operation. The error status bit 220 and the ALERT signal 440 are not set or asserted during the events 412 to 418. In the event 420, the memory module receives the CRC for the written data and it checks if the written data is correct based on the CRC. When a CRC error is detected or determined, the memory module 120 sets the error status bit 220 in the event 432. The memory module 120 sends a pulse on the ALERT signal 440 to indicate to the memory control hub 110 that a CRC error has been detected.

The memory control hub 110 can easily differentiate between a CRC error or a parity error from the memory module 120 by examining the ALERT signal 440. The number of clock cycles or width of the pulse can be set to any suitable number that the memory control hub is able to detect. In one embodiment of the invention, the pulse width of the ALERT signal 440 is set to two clock cycles when a CRC error is detected by the memory module 120. One of ordinary skill in the relevant art will readily appreciate that other variations of indicating the CRC error to the memory control hub 110 can be used without affecting the workings of the invention.

Figure 5:
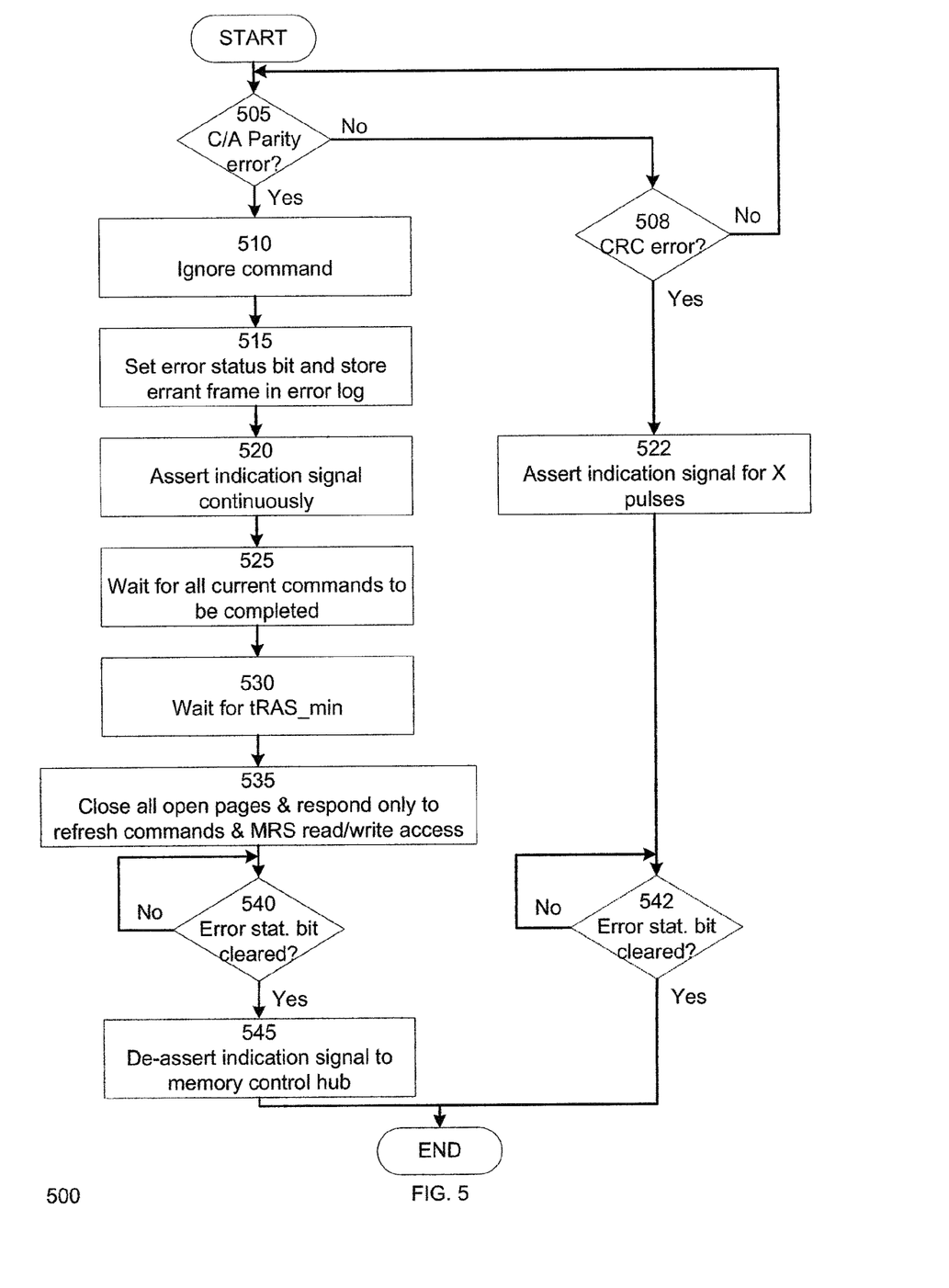
FIG. 5 illustrates a flow chart of the steps to perform error management in a memory module in accordance with one embodiment of the invention.

FIG. 5 illustrates a flow chart 500 of the steps to perform error management in a memory module 120 in accordance with one embodiment of the invention. For clarity of illustration, FIG. 5 is discussed with reference to FIG. 1. In step 505, the memory module 120 checks if there are any C/A parity error in any received command, where the received command is qualified by a chip select (CS) signal. If there is no C/A parity error, the memory module 120 checks if there is any CRC error in step 508. If there is no CRC error, the memory module 120 goes back to step 505. If there is a CRC error, the memory module 120 asserts an indication signal for X pulses in step 522.

The number X can be any suitable number that allows the memory control hub 110 to differentiate between a parity error and a CRC error. The width of the X pulses can also be varied in one embodiment of the invention. In optional step 542, the memory module checks if the error status bit 220 is cleared or de-asserted by the memory control hub 110. The memory control hub 110 clears the error status bit 220 after it has finished the error recovery for the errant command. If the error status bit 220 is cleared, the flow ends. If the error status bit 220 is not cleared, the memory module 120 goes back to step 542.

If there is a C/A parity error, the memory module 120 ignores the received command with the C/A parity error in step 510. The memory module ignores all other external commands in step 510. In step 515, the memory module 120 sets or asserts the error status bit 220 and stores the errant command frame in the error log bits 230. In step 520, the memory module 120 asserts an indication signal continuously. In one embodiment of the invention, the indication signal is the ALERT signal 340. In step 525, the memory module 120 waits for all current commands to be completed. The current commands are received prior to the errant command.

In step 530, the memory module 120 waits the minimum active-to-precharge command delay (tRAS min) to lapse. In step 535, the memory module 120 closes all open memory pages and responds only to refresh commands and MRS read/write commands from the memory control hub 110. In step 540, the memory module 120 checks if the error status bit 220 is cleared by the memory control hub 110. The memory control hub 110 clears the error status bit 220 after it has finished the error recovery for the errant command. If the error status bit 220 is cleared or de-asserted, the memory module 120 de-asserts the indication signal in step 545 and the flow ends. If the error status bit 220 is not cleared, the memory module 120 goes back to step 540.

Figure 6:
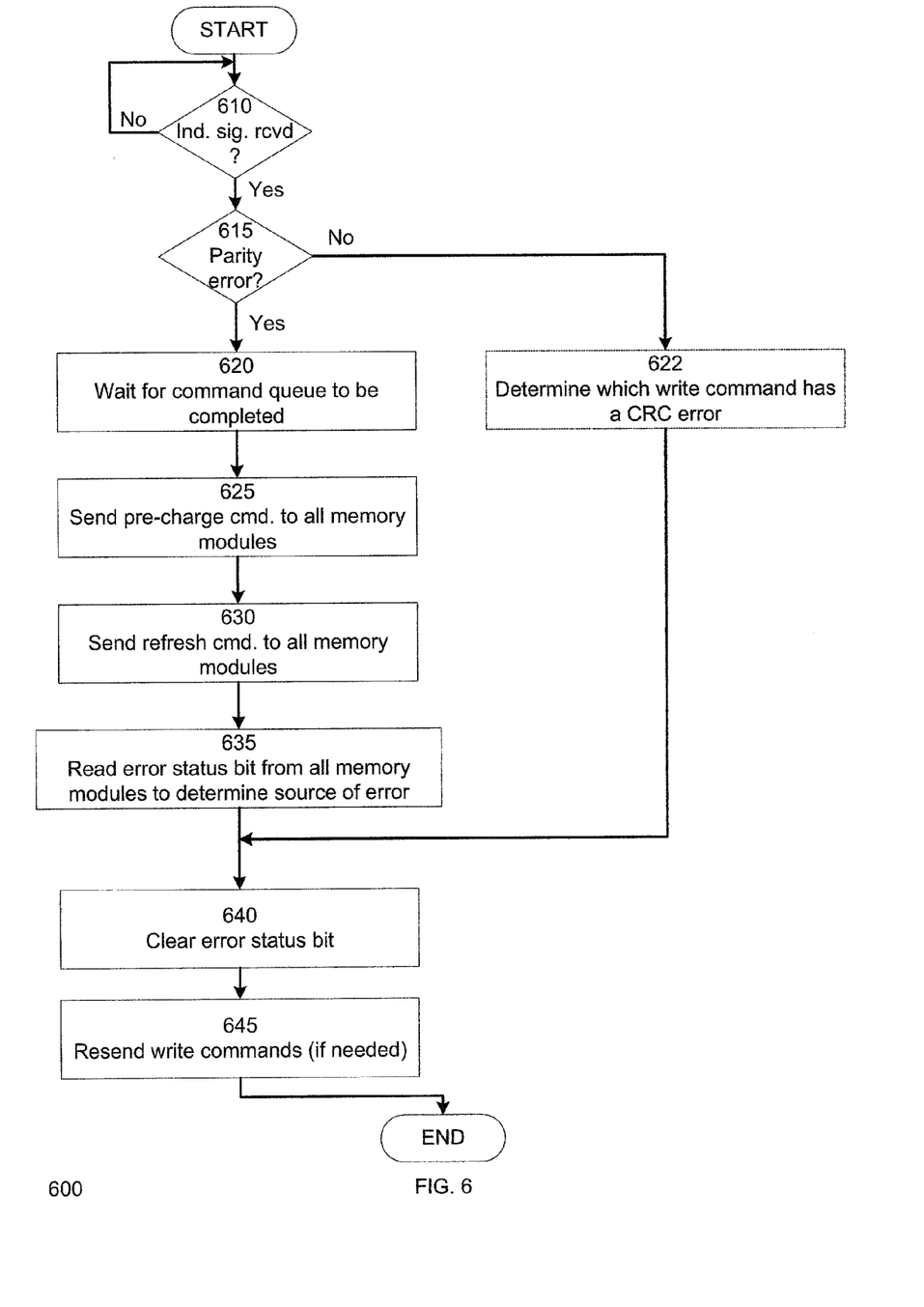
FIG. 6 illustrates a flow chart of the steps to perform error management in a memory controller hub in accordance with one embodiment of the invention.

FIG. 6 illustrates a flow chart 600 of the steps to perform error management in a memory controller hub 110 in accordance with one embodiment of the invention. For clarity of illustration, FIG. 6 is discussed with reference to FIG. 1. In step 610, the memory control hub 110 checks if it has received any indication signal. In one embodiment of the invention, the indication signal is the ALERT signal 340. If no indication signal is received, the memory control hub 110 goes back to step 610. If an indication signal is received, the memory control hub 110 checks if the indication signal indicates a parity error in step 615. If the indication signal has indicated a parity error, the memory control hub 110 waits for the current command queue to be completed in step 620.

In step 625, the memory control hub 110 sends a precharge command to all memory modules. All memory modules, except the memory module that has a parity error, execute or perform the precharge command from the memory control hub 110. In step 630, the memory control hub 110 sends a refresh command to all the memory modules to retain the data in each memory module. All memory modules, including the memory module that has a parity error, execute or perform the refresh command from the memory control hub 110.

In step 635, the memory control hub 110 reads the error status bit 220 from each memory module to determine which memory module is the source of the error. For example, in one embodiment of the invention, the memory control hub 110 is connected to four memory modules. The memory control hub 110 reads the error status bit 220 from each of the four memory modules to determine which of the four memory modules has received a command with a C/A parity error.

In step 640, the memory control hub 110 clears the error status bit 220 from the memory module that has received the command with a C/A parity error. In step 645, the memory control hub 110 resends the write command (if needed) to the memory module that has received the command with a C/A parity error and the flow ends.

In step 615, if there is no parity error detected in the indication signal, it means that a CRC error has been detected and the flow goes to optional step 622. For purposes of illustration, the memory control hub 110 is able to detect either a parity error or a CRC error. In optional step 622, the memory module determines which of the memory modules has received a write command with a CRC error. In one embodiment of the invention, the memory control hub 110 detects or determines which of the memory modules has received a write command with a CRC error by examining the timing of the indication signal and the propagation delay of the indication signal. In another embodiment of the invention, step 622 is not performed and the memory control hub 110 handles CRC error by backing up write commands to a certain point which assumes that the furthest DRAM device has the CRC error and then resends all the write commands from that point on. The worst case latency for the ALERT signal can be determined as part of training before using the memory channel for write commands.

Figure 7:
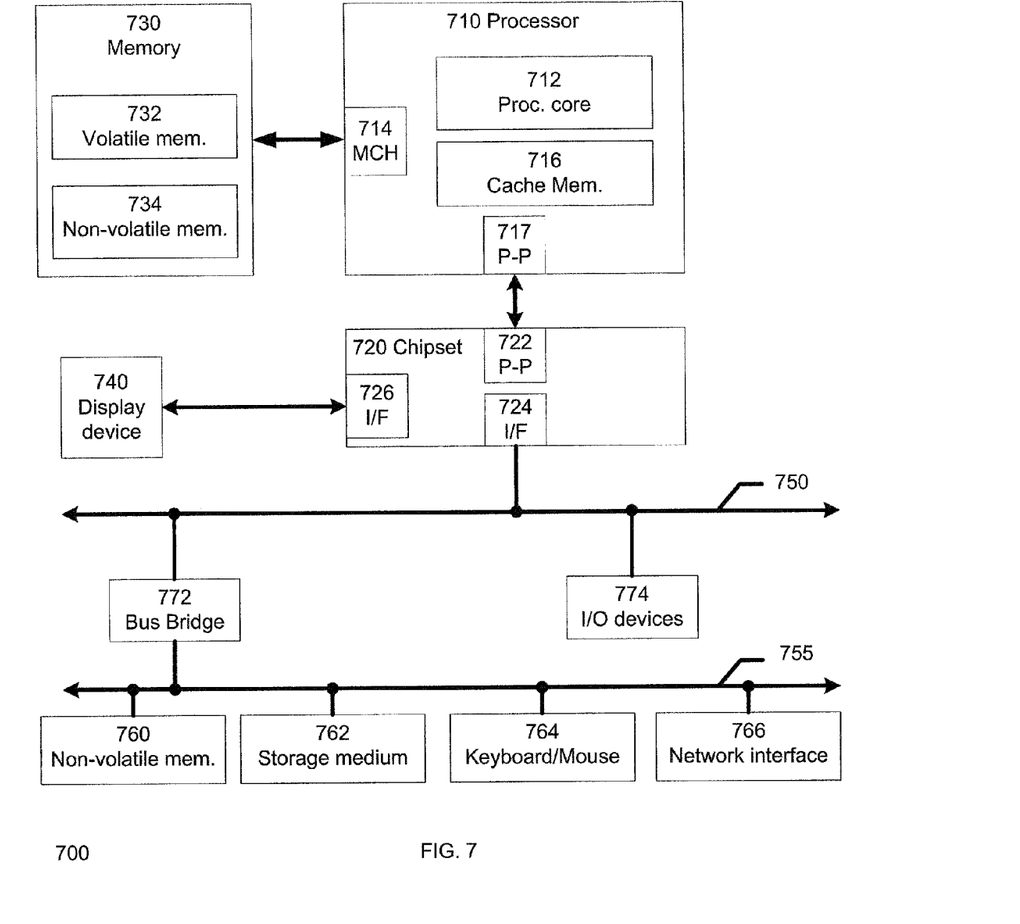
FIG. 7 illustrates a system to implement the methods disclosed herein in accordance with one embodiment of the invention.

FIG. 7 illustrates a system 700 to implement the methods disclosed herein in accordance with one embodiment of the invention. The system 700 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 700 used to implement the methods disclosed herein may be a system on a chip (SOC) system.

The processor 710 has a processing core 712 to execute instructions of the system 700. The processing core 712 includes, but is not limited to, pre-fetch logic to fetch instructions, decode logic to decode the instructions, execution logic to execute instructions and the like. The processor 710 has a cache memory 716 to cache instructions and/or data of the system 700. In another embodiment of the invention, the cache memory 716 includes, but is not limited to, level one, level two and level three, cache memory or any other configuration of the cache memory within the processor 710.

The memory control hub (MCH) 714 performs functions that enable the processor 710 to access and communicate with a memory 730 that includes a volatile memory 732 and/or a non-volatile memory 734. The volatile memory 732 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 734 includes, but is not limited to, NAND flash memory, phase change memory (PCM), read only memory (ROM), electrically erasable programmable read only memory (EEPROM), or any other type of non-volatile memory device.

The memory 730 stores information and instructions to be executed by the processor 710. The memory 730 may also stores temporary variables or other intermediate information while the processor 710 is executing instructions. The chipset 720 connects with the processor 710 via Point-to-Point (PtP) interfaces 717 and 722. The chipset 720 enables the processor 710 to connect to other modules in the system 700. In one embodiment of the invention, the interfaces 717 and 722 operate in accordance with a PtP communication protocol such as the Intel® QuickPath Interconnect (QPI) or the like.

The chipset 720 connects to a display device 740 that includes, but is not limited to, liquid crystal display (LCD), cathode ray tube (CRT) display, or any other form of visual display device. In one embodiment of the invention, the processor 710 and the chipset 720 are merged into a SOC. In addition, the chipset 720 connects to one or more buses 750 and 755 that interconnect the various modules 774, 760, 762, 764, and 766. Buses 750 and 755 may be interconnected together via a bus bridge 772 if there is a mismatch in bus speed or communication protocol. The chipset 720 couples with, but is not limited to, a non-volatile memory 760, a mass storage device(s) 762, a keyboard/mouse 764 and a network interface 766.

The mass storage device 762 includes, but is not limited to, a solid state drive, a hard disk drive, an universal serial bus flash memory drive, or any other form of computer data storage medium. The network interface 766 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 7 are depicted as separate blocks within the system 700, the functions performed by some of these blocks may be integrated within a single semiconductor circuit or may be implemented using two or more separate integrated circuits. For example, although the cache memory 716 is depicted as a separate block within the processor 710, the cache memory 716 can be incorporated into the processor core 712 respectively. The system 700 may include more than one processor/processing core in another embodiment of the invention.

FIG. 8 illustrates a timing diagram for one embodiment of a technique for error management. In one embodiment, the CRC error mechanism shares the same ALERT_n signal for reporting errors on writes to the DRAM. The controller has no way to distinguish between CRC errors and Command/Address/Parity errors other than to read the DRAM mode registers. This can be a time consuming process. To speed up recovery for CRC errors, CRC errors are only sent back as a pulse. In one embodiment, the minimum pulse width is two clock cycles; however other minimum pulse widths can also be supported. The latency for the ALERT_n signal is defined as tCRC_ALERT in FIG. 8.

The DRAM sets the error status bit to 1 upon detecting a CRC error. In one embodiment, the location of the CRC bit is Bit 7 in Mode Register 3. The CRC Error bit remains set at 1 until the host clears it explicitly using a mode register (e.g., MRS) command.

The controller, upon seeing an error as a pulse width, retries write transactions. The controller knows the worst case delay for ALERT_n (during init) and can backup the transactions accordingly or the controller can be made more intelligent and try to correlate the write CRC error to a specific rank or transaction. The controller is also responsible for opening any pages and ensuring that retrying of writes is done in a coherent fashion.

The pulse width may be seen longer than two clock cycles at the controller if there are multiple CRC errors as the ALERT_n is a daisy chain bus. CRC errors are not "sticky" whereas C/A Parity errors are "sticky."

Figure 9:
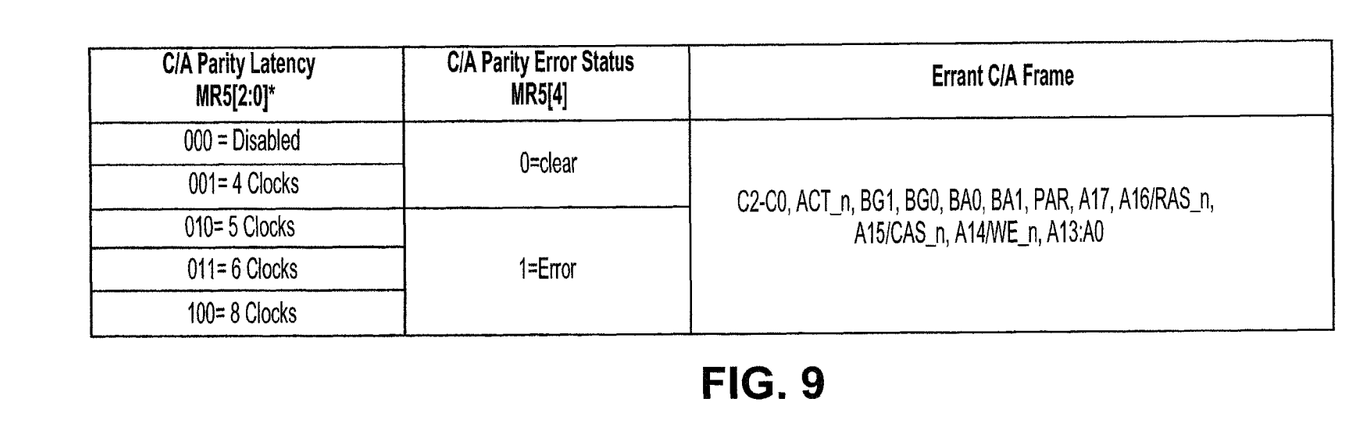
FIG. 9 illustrates example mode register entries for C/A Parity.

FIG. 9 illustrates example mode register entries for C/A Parity. In one embodiment the C/A Parity bits are write only, Parity Error Status bits is read/werite and error logs are read only bits. The controller can only program the Parity Error Status bit to 0. If the controller illegally attempts to write to a 1 1 to the Parity Error Status bit, the DRAM does not guarantee that parity will be checked. The DRAM may opt to block the controller from writing a 1 to the Parity Error Status bit.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system comprising:
    a memory controller including
        a double data rate (DDR) interface to couple the memory controller to a DDR memory channel,
        logic to generate a write data frame,
        cyclic redundancy check (CRC) logic to provide a CRC checksum to cover the write data frame,
        logic to generate a synchronous dynamic random access memory (SDRAM) command,
        parity handling logic to provide parity coverage for the SDRAM command, and
        logic to receive an Alert_n signal from the DDR interface and to determine whether the Alert_n signal indicates a CRC error or a parity error; and
    an SDRAM device coupled with the memory controller, the SDRAM device including
        a mode register,
        a memory array, and
        error handling logic capable of
            asserting the Alert_n signal for a first pulse width responsive to the parity error and
            asserting the Alert_n signal for a second pulse width responsive to the CRC error.

2. The system of claim 1, wherein the logic to receive the Alert_n signal from the DDR interface and to determine whether the Alert_n signal indicates a CRC error or a parity error comprises logic to determine whether the Alert_n signal has the first pulse width or the second pulse width.

3. The system of claim 2, wherein the first pulse width is greater than four clock cycles.

4. The system of claim 2, wherein the second pulse width is less than or equal to four clock cycles.

5. The system of claim 4, wherein the second pulse width is two clock cycles.

6. The system of claim 4, wherein the second pulse width is four clock cycles.

7. The system of claim 1, wherein the SDRAM device is a DDR4 SDRAM device.

8. The system of claim 1, wherein the SDRAM device is an LPDDR4 SDRAM device.

9. A synchronous dynamic random access memory (SDRAM) device, the SDRAM device comprising:
   a mode register;
   a memory array; and
   a double data rate (DDR) interface to couple the SDRAM device to a DDR memory channel;
   logic to receive a write data frame from the DDR interface;
   cyclic redundancy check (CRC) logic to detect a CRC error in the write data frame;
   logic to receive a synchronous dynamic random access memory (SDRAM) command from the DDR memory channel;
   parity handling logic to detect a parity error in the SDRAM command; and
   error handling logic capable of
      asserting the Alert_n signal for a first pulse width responsive to the parity error and
      asserting the Alert_n signal for a second pulse width responsive to the CRC error.

10. The SDRAM device of claim 9, wherein the SDRAM device is a DDR4 SDRAM device.

11. The SDRAM device of claim 9, wherein the SDRAM device is a LPDDR4 SDRAM device.

12. A memory controller comprising:
   a double data rate (DDR) interface to couple the memory controller to a DDR memory channel;
   logic to generate a write data frame;
   cyclic redundancy check (CRC) logic to provide a CRC checksum to cover the write data frame including data to write to memory;
   logic to generate a synchronous dynamic random access memory (SDRAM) command;
   parity handling logic to provide parity coverage for the SDRAM command, and
   logic to receive an Alert_n signal from the DDR interface and to determine whether the Alert_n signal indicates a CRC error or a parity error.

13. The memory controller of claim 12, wherein the memory controller is integrated onto the same integrated circuit as a processor.

14. The memory controller of claim 12, wherein the SDRAM command is a DDR4 SDRAM command.

15. The memory controller of claim 12, wherein the SDRAM command is an LPDDR4 SDRAM command.

16. The memory controller of claim 12, wherein the logic to determine whether the Alert_n signal indicates a CRC error or a parity error comprises logic to determine whether the Alert_n signal has a first pulse width or a second pulse width different from the first pulse width.

* * * * *